July 19, 1966   M. E. WILKE   3,261,718
RESERVE ELECTRIC BATTERY
Filed April 8, 1964   2 Sheets-Sheet 1
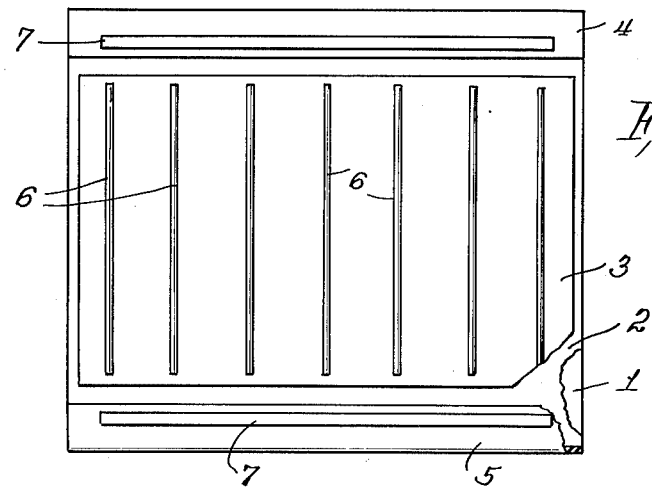
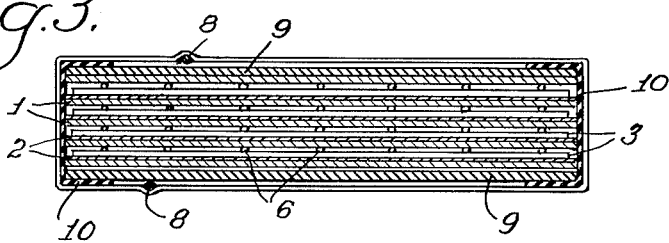
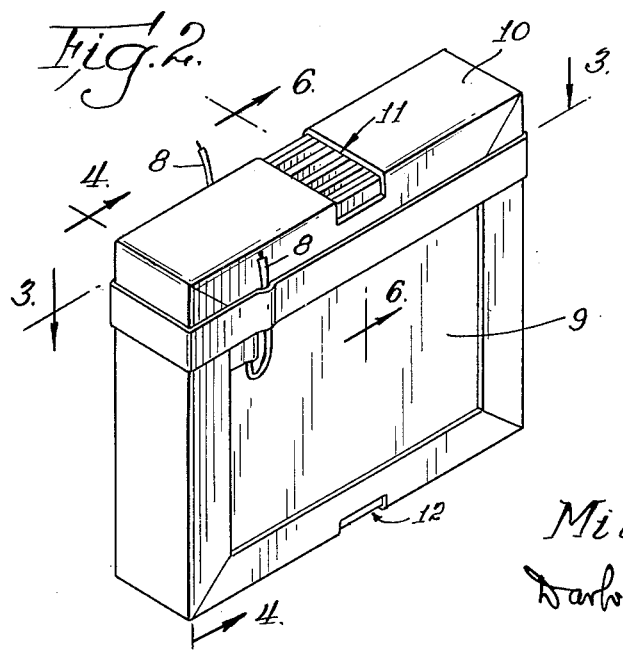
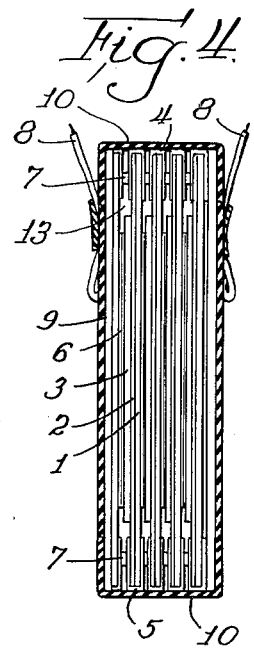
INVENTOR.
Milton E. Wilke
BY
Darbo, Robertson + Vandenburgh
attys.

July 19, 1966  M. E. WILKE  3,261,718
RESERVE ELECTRIC BATTERY
Filed April 8, 1964  2 Sheets-Sheet 2
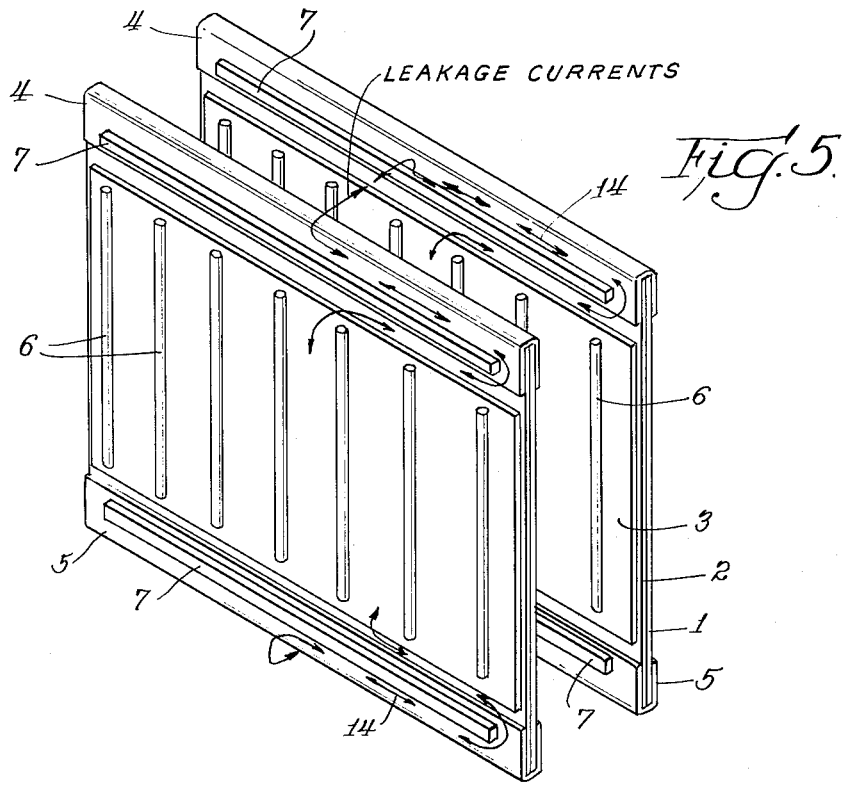
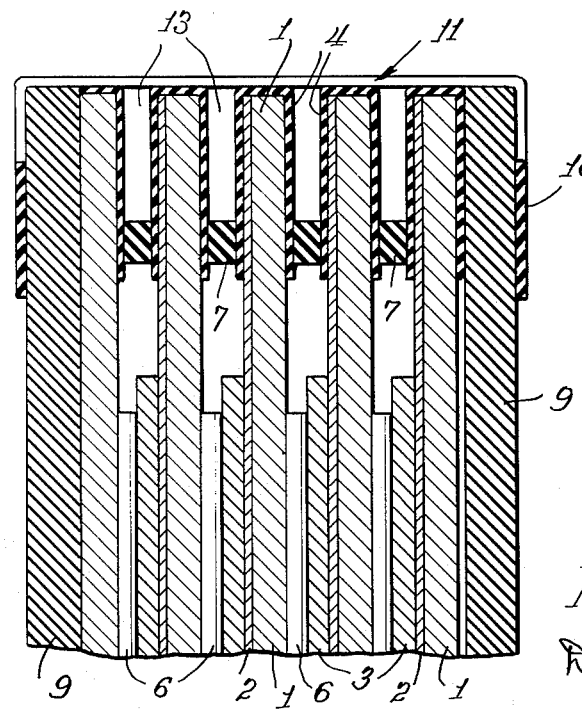
INVENTOR.
Milton E. Wilke
BY
Darby, Robertson & Vandenburgh
Attys.

United States Patent Office 3,261,718
Patented July 19, 1966

3,261,718
RESERVE ELECTRIC BATTERY
Milton E. Wilke, Freeport, Ill., assignor to Servel, Inc., Evansville, Ind., a corporation of Delaware
Filed Apr. 8, 1964, Ser. No. 358,320
5 Claims. (Cl. 136—90)

This invention relates to electric primary batteries of the reserve type and more particularly to the problem of minimizing loss of electrical capacity resulting from the flow of leakage currents between the electrodes of the cells of which the battery is composed.

Reserve batteries are completely constructed batteries which are not supplied with electrolyte to activate the several cells until just before the batteries are to be used. Thus, they may be stored almost indefinitely without loss of capacity but are, nevertheless, ready for instant use. Furthermore, by keeping the battery and cells thereof entirely dry until use is imminent, electrode materials having potentially high electrochemical activity may be employed because there is no problem of deterioration during storage. For example, magnesium anodes and silver chloride cathodes may be used to supply extremely high currents in relation to the size and weight of the cell materials. These batteries may be used to power such devices as proximity fuses, emergency signaling apparatus, and sonobuoys.

Reserve batteries of the type described may be comprised of a plurality of cells each comprising a magnesium anode, a silver chloride cathode, a silver foil terminal engaging the cathode as a current collector, and means for electrically separating the cathode and anode and providing space for the eventual entry of electrolyte between the anode and cathode. It is a common and convenient practice to spot weld or otherwise electrically and mechanically fasten the silver foil to one side of the magnesium anode and tape top edges together and bottom edges together to form a duplex electrode and this sub-assembly is arranged in the battery with the exposed surface of the silver foil engaging the silver chloride cathode. The several cells are arranged in series in a stack which is taped or otherwise enclosed and fastened together to form the battery, suitable terminal wires having been welded, soldered or otherwise electrically and mechanicaly connected to the electrodes of the terminal cells for external connection to the apparatus with which the batteries are to be used. Openings are provided for the entry of electrolyte into the battery and the batteries are activated by immersing them either in a prepared electrolyte or in sea water as the electrolyte.

It will be understood that when the battery is immersed in the electrolyte, which electrolyte is electrically conductive to a degree, the electrodes of the several cells of the battery are in effect electrically connected together through the body of electrolyte outside of the battery and, these electrodes being at different potentials, the result is an appreciable flow of current. This leakage current robs the battery of part, small but appreciable, of its electrical capacity.

The principal object of the invention is to provide means for minimizing such leakage currents in reserve type batteries after activation. This object is accomplished by substantially lengthening the leakage current paths and thus increasing the resistance to the flow of such currents.

Other objetcs and advantages of the invention will become apparent from the following description and the accompanying drawings in which:

FIG. 1 is a detailed view showing certain elements of a cell with the leakage path-defining spacers in place;

FIG. 2 is a perspective view of a completely assembled reserve battery embodying the invention;

FIG. 3 is a cross-sectional view of the reserve battery, taken at the line 3—3 of FIG. 2;

FIG. 4 is a cross-section of the battery taken at the line 4—4 of FIG. 2;

FIG. 5 is an exploded view of adjacent battery subassemblies showing the leakage current paths, and FIG. 6 is a detail view, in cross-section, taken at the line 6—6 of FIG. 2 showing the battery structure of the invention.

In reserve batteries of known construction; for example, the battery of Patent No. 3,061,659, the interiors of the several cells open directly to the atmosphere so that, when immersed for activation, the interiors of the cells open directly to the body of electrolyte outside of the battery. The electrodes of the battery cells are thus quite directly connected together through the electrolyte with the result that leakage currents are appreciable. In accordance with the present invention, these channels, which are the potential leakage paths, are made more devious and therefore longer with the result that leakage current flow is minimized.

Although FIG. 1 does not show a complete single cell, it does illustrate a subassembly which includes all of the parts used in the cells. The principal structural strength of this subassembly is provided by a sheet 1 of magnesium which will become a cell anode. A sheet 2 of silver foil covers the entire surface of the magnesium anode and will become a terminal for the cathode 3 of silver chloride which engages the silver foil terminal 2. The magnesium sheet and silver foil are bound together along two opposite edges, the upper and lower edges in the example illustrated in FIG. 1, by means of non-conductive film tapes 4 and 5. Non-conducting spacing elements 6 are arranged in spaced relation to each other upon the silver chloride cathode. Nylon threads may be used for such separators, and other expedients and materials may be employed instead of the nylon thread separators 6. The function of the separators is to maintain a space between the cathode 3 and an anode 1 which in the assembled battery will overlie the structure shown in FIG. 1.

Elongated spacers 7 of electrically non-conductive material are cemented to the tapes 4 and 5 of the duplex electrodes along the upper and lower edges thereof. These spacers stop short of the side edges of the duplex electrode, as illustrated, are spaced from the upper and lower edges of the duplex electrode, and are approximately equal in thickness to the total thickness of the cathode 3 and separators 6, minus the thickness of the tape film so that in the battery assembly channels 13 for the passage of electrolyte and air are defined by the spacers 7, the inside surfaces of battery enclosure 10, and tape films 4 or 5. When the battery is immersed, these channels become electrical leakage paths.

The reserve batteries, such as that shown in FIGS. 2–4, are assembled by stacking the desired number of the subassemblies of FIG. 1 to provide a series of cells. A single magnesium anode is arranged to cover the exposed cathode at one end of the stack. Suitable terminal wires 8 are welded, soldered or otherwise mechanically and electrically connected to the outermost electrodes of the stack. Covers 9 of fiberboard or other suitable material are arranged at opposite ends of the stack of cells and the battery is completed by binding the cells together and providing an enclosure by means of tape binding 10, leaving openings 11 and 12 to expose the interiors of all of the cells for the entry of electrolyte and escape of air as it is displaced by the electrolyte upon immersion of the battery.

As is best seen by reference to FIGS. 5 and 6, channels 13 open to the atmosphere through openings 11 and 12 and also connect with the interiors of the cells beyond the ends of the spacers 7. When the battery is immersed, electrolyte rapidly enters through opening 12 and air is vented through the upper opening 11 until the space within the battery is completely filled with electrolyte. The flow of electrolyte and air is indicated by arrows 14 which also indicate the leakage current paths of the immersed battery. Instead of the direct exposure of known reserve batteries, it will be observed that electrical leakage connection paths extend from the openings 11 and 12, located midway between the ends of the battery, around past the ends of spacers 7 and only then to the cell electrodes. Thus, the magnitude of leakage currents is minimized by confining them to long indirect paths with the consequent imposition of high resistance between the electrodes of differing potentials.

It will be understood that the novel construction herein described is useful with batteries employing any electrochemical system, the magnesium-silver chloride system being used only by way of example. The essential concept of the invention resides in the long channels which define correspondingly long electrical paths. It will further be understood that the desired long channels may be provided by mechanical designs which differ somewhat from the particular structure shown and described herein as ilustrative of the invention. The openings 11 and 12 may be located, for example, near one end of the battery and the spacers 7 extended to the same end of the battery so that the channels extend the full length of the battery before opening into the cells, or openings may be provided near both ends of the battery with a gap in the spacers in the middle of the battery connecting the channels with the cells. Other alternative design possibilities will be apparent to those skilled in the art from the disclosure herein.

Invention is claimed as follows:

1. In a reserve battery comprising a stack of cells each having spaced electrodes, said stack being arranged within an enclosure having an opening therein providing limited communication between the interior and the exterior of the enclosure, the improvement which comprises means which together with the inside surfaces of the enclosure, form individual channels connecting respectively the interiors of the several cells with the opening in said enclosure, said channels being defined by non-conducting surfaces and being elongated to limit communication of the interiors of the cells with the exterior of the battery to long indirect paths.

2. Structure in accordance with claim 1 wherein the opening in the enclosure is located at the top of the battery and wherein the enclosure has a second opening at the bottom of the battery, and including means as defined in claim 1 which form channels connecting the respective cells with said second opening.

3. In a reserve battery comprising a stack of cells each having spaced electrodes, said stack being arranged within an enclosure having an opening therein providing limited communication between the interior and the exterior of the enclosure, the improvement which comprises film means covering the marginal portions of cell electrodes along one side of the stack, elongated spacers interposed between the electrodes of each cell defining, together with said film means and the inside surfaces of the enclosure, individual channels connecting respectively the interiors of the several cells with the opening in said enclosure, said channels being elongated to limit communication of the interiors of said cells with the exterior of the battery to long indirect paths.

4. Structure in accordance with claim 3 wherein the spacers underlie the opening in the enclosure and extend both directions therefrom to provide channels, each having two oppositely extending branches communicating with the interior of a cell.

5. In a reserve battery having contained within an enclosure a stack of spaced flat rectangular duplex electrodes secured together by non-conductive film extending over the top and bottom marginal portions and edges of the electrodes, said enclosure having an opening in the top and an opening in the bottom thereof providing limited communication between the interior and exterior of the enclosure, the improvement which comprises elongated spacers arranged in the spaces between adjoining duplex electrodes and spaced from the enclosure at the top and at the bottom of the battery to define, together with the non-conductive film and enclosure, channels respectively communicating with the respective openings in the enclosure and extending a substantial distance therefrom before opening into the spaces in the interior of the battery between the electrodes and spacers.

References Cited by the Examiner

UNITED STATES PATENTS

| | | |
|---|---|---|
| 2,474,716 | 6/1949 | Bechlyn. |
| 3,061,659 | 10/1962 | Wilke et al. _____ 136—90 |
| 3,178,316 | 4/1965 | Wilke _____ 136—90 X |

WINSTON A. DOUGLAS, Primary Examiner.

D. L. WALTON, Assistant Examiner.